United States Patent Office 3,404,877
Patented Oct. 8, 1968

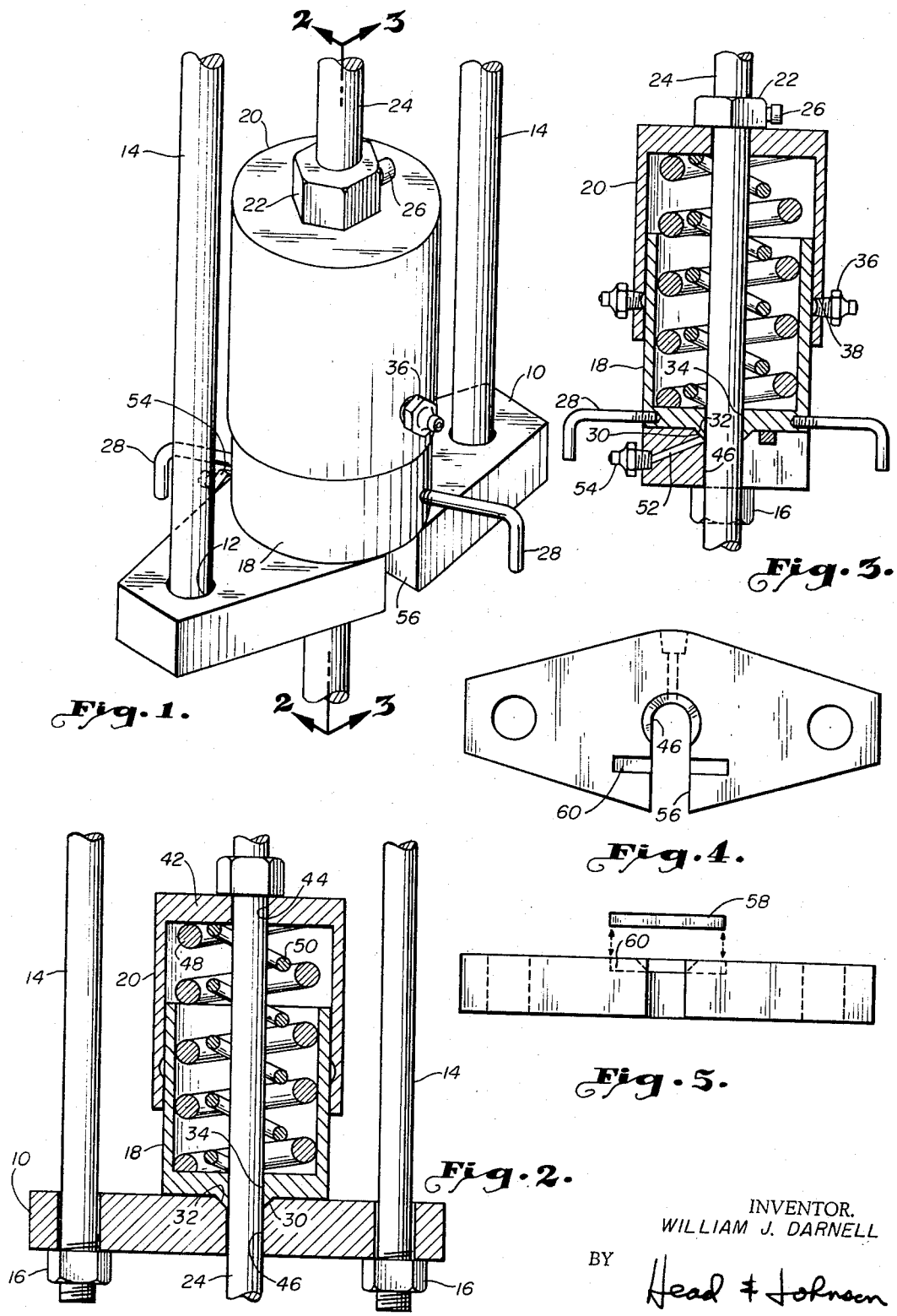

3,404,877
SHOCK ABSORBER
William J. Darnell, 2504 W. 51st St.,
Tulsa, Okla. 74107
Filed June 20, 1966, Ser. No. 558,700
6 Claims. (Cl. 267—1)

This invention relates to shock absorbers. More particularly, this invention relates to shock absorbers for oil well pumping equipment for absorbing shocks imposed on the polished rod and hangers.

In oil well pumping operations the pump at the bottom of the well is actuated by a string of sucker rods extending the length of the well to and above the surface of the ground. Just below the wellhead the uppermost sucker rod is attached to an accurately machined and highly polished rod which passes through the sealing elements of the wellhead equipment and is usually attached in some slidable manner to the hangers of the walking beam. The polish rod is an accurately machined piece of equipment and is quite expensive. Should it break it would be expensive to replace. Should any of the sucker rods be broken or damaged, the expense involved in shutting down the well production and replacing the damaged rod would also be quite expensive. Damage to the polish rod and sucker rods can occur because of slack in the rods as the walking beam begins its downstroke and because of sudden stresses placed upon the rods as the beam begins its upstroke. Various kinds of shock absorbers have been designed to ease the sudden shock and wear upon the polish rod and sucker rods but even with the use of those that are currently in use the life of a polish rod might be only several months.

An object of this invention therefore is to prolong the life of polish rods and sucker rods.

Another object of this invention is to provide a shock absorber for oil well pumping equipment which is quickly and easily removable and replaceable with a minimum of shut down time.

Another object of this invention is to provide a shock absorber for oil well pumping equipment which minimizes wear on the polish rod and sucker rods.

Still another object of this invention is to provide a shock absorber which will reduce wear in the oil well pumping equipment of which it is a part.

Further objects and advantages of the invention will become apparent from the following description and claims and from the accompanying drawings in which:

FIGURE 1 is a perspective view of a shock absorber according to this invention showing its manner of connection to certain oil well components.

FIGURE 2 is a view in partial cross section along the line 2—2 of FIGURE 1.

FIGURE 3 is a view along the line 3—3 of FIGURE 1.

FIGURE 4 is a top elevational view of a base plate component of this invention.

FIGURE 5 is a front elevational view of a base plate component of this invention.

The present invention describes a shock absorber mountable between the hangers of a walking beam and a polish rod, the shock absorber including a base plate component supportable by the hanger rods and having an opening for the polish rod, a first cylindrical member positionable upon the base plate having a polish rod opening corresponding to the opening of the base plate and having an open upper end, a second cylindrical member positionable slidably on the first cylindrical member and having an open lower end and a polish rod opening in the upper end coaxial with the polish rod opening in the base plate and in the first cylindrical member, and a coil spring within the first and second cylindrical members, the coil spring coaxial with the various polish rod openings and compressible between the two cylindrical members upon slidable movement of those cylindrical members, and in which the base plate has a counterbore coaxial with its polish rod opening, which counterbore is adaptable to receive a flange portion abuttable thereto in the lower end of the first cylindrical member in a manner that the cooperation of the flange portion and counterbore tend to keep the cylindrical members and coil spring centrally positioned in regard to the polish rod opening in the base plate. Preferably, for heavy duty operation, the shock absorber includes a pair of coil springs of opposite pitch positioned concentrically within the first and second cylindrical members. The device further includes a key slot in the base portion and a key receivable therein which cooperates to keep the base plate positionable about the polish rod when the apparatus is assembled.

Referring now to the drawings in detail, FIGURE 1 is a perspective view of an oil well shock absorber prepared according to this invention. The apparatus shown in FIGURE 1 is seen to comprise a base plate 10 which serves both to support the components of the invention and as a means for maintaining the components in proper alignment. Base plate 10 includes openings 12 through which hanger rods 14 are passed and secured in position by nuts 16 below the base plate to connect the base plate to the walking beam component of the pumping equipment. Supportable upon base plate 10 is a first cylindrical member 18 over which is positioned a second cylindrical member 20 in a close fitting slidable arrangement. The manner in which cylinders 18 and 20 are positioned on base plate 10 is more clearly shown in other figures described hereinafter. A clamp 22 is provided to limit the movement in a first direction of cylinders 18 and 20 and also to serve as a means for holding the apparatus in position on a polish rod 24. Clamp 22 is secured by means of a set screw 26. A hook 28 is provided as a grasping means for lifting the cylindrical components from the base plate.

FIGURES 2 and 3 show more clearly the cooperation of the components of the apparatus. Thus, in FIGURES 2 and 3 it is seen how first cylindrical member 18 rests on base plate 10 and is held in position on base plate 10 by the fitting of flange portion 30 against counterbore 32. Flange portion 30 in its preferred embodiment encircles polish rod opening 34 in the first cylindrical member and substantially defines a conical section for efficient prevention of sideways movement of cylindrical member 18. Because second cylindrical member 20 does fit closely over cylindrical member 18, a grease fitting 36 is fitted into a grease opening 38 which communicates with a lubricating groove 40 in cylindrical member 20 so that lubricant may be provided between the sliding surfaces of the two cylindrical members. Cylindrical member 20 is in an inverted position over cylindrical member 18 in that it has an enclosed upper end 42 with a polish rod opening 44 therein. Opening 44 is substantially in alignment with opening 34 in cylindrical member 18 and with a polish rod opening 46 in base plate 10. The alignment and positioning of these polish rod openings permit a polish rod 24 to be positioned substantially centrally through base plate 10, cylindrical member 18 and cylindrical member 20 with close tolerance for efficient operation of the apparatus.

The shock absorbing action of the apparatus comes about through the positioning of a pair of coil springs 48 and 50 within cylindrical members 18 and 20 and surrounding polish rod 24. Preferably, the springs are of opposite pitch to give greater stability. Positioning the coil springs within the cylindrical members and surrounding the polish rod maintains the shock absorber in good alignment with respect to the polish rod and decreases wear on the polish rod through abrasion caused by misalignment. Also, with the springs positioned around the polish rod, should one of the springs break, the shock absorbing motion of the apparatus is not completely lost since the apparatus is still maintained in proper position around the polish rod. Were the springs to be positioned at the extremities of the base plate a broken spring would immediately cause misalignment of the apparatus with consequent damage or destruction of the polish rod. Also, there are presently shock absorbers in which the shock absorbing motion is assimilated by rubber cushions. One great advantage of coil springs over rubber cushions is that the motion of the polish rod and hanger rods near the end of the upstroke and downstroke may be assimilated over greater stroking distance and longer time with consequent smooth motion of the pumping equipment and less wear throughout the moving parts of the pumping equipment, for instance on the gear directly connected to the walking beam. For example, with no shock absorber the abrupt stop at the end of each stroke is transmitted directly to one tooth of the large driving gear. With a shock absorber employing rubber cushions, the shocking force at the end of each stroke is slightly dispersed among a few gear teeth. But with a shock absorber employing coil springs the shocking force is spread out over a large number of gear teeth so that the wear upon this large and expensive driving gear is negligible.

Clamp 22 holds the cylindrical members in position and limits their upward movement as regards polish rod 24 and also serves as a means of adjustment of the tension of the coil springs within the cylindrical members. During the shock absorbing action of the apparatus, the coil springs are compressed between the lower end of cylindrical member 18 and the upper end 42 of cylindrical member 20.

To provide lubrication for the polish rod, a lubricant passage 52 communicates with opening 46 in base plate 10 and is closed by a grease fitting 54.

For quick and easy removal of the cylindrical components from base plate 10, hooks 28 are provided on either side of cylindrical member 18 near the bottom thereof so that cylindrical members 18 and 20 may be lifted from base plate 10, such as by throwing a cable around hooks 28. From the drawing and description it is seen that none of the components of the shock absorber are secured to each other. The only means of holding the shock absorber in position is provided by nuts 16 at the end of hanger rods 14 which support base plate 10 and by clamp 22 on the polish rod to hold cylindrical members 18 and 20 in position. In assembly, base plate 10 is positioned on hanger rods 14 supported by nuts 16 and positioned around polish rod 24 by sliding polish rod 24 through slot 56 in base plate 10 to its proper position in opening 46. Plate 10 is held in its relative position around rod 24 by the positioning of a key 58 in key slot 60 in base plate 10. Key 58 and slot 60 are designed so that key 58 does not protrude above the upper surface of base plate 10, permitting cylindrical member 18 to rest flush against base plate 10.

Since many different embodiments of this invention may be made without departing from the spirit and scope thereof, it is to be understood that the specific embodiment described in detail herein is not to be taken in a limiting sense, since the scope of the invention is best defined by the appended claims.

What is claimed:
1. A shock absorber for oil well pumping equipment comprising:
   a base plate supportable by hanger rods, said base plate having a substantially central polish rod opening therethrough and a counterbore on an upper side of said plate coaxial with said opening, said counterbore of said base plate defining a conical section;
   a first cylindrical member having a polish rod opening in a lower end thereof and a flange portion adjacent said opening, said flange portion abuttable against said counterbore and encircling said polish rod opening and defining a conical section to abut within said counterbore conical section;
   a second cylindrical member slidably positionable upon said first cylindrical member, said second cylindrical member having a polish rod opening in an upper end thereof; and
   a coil spring member within said first and said second cylindrical members, said spring also coaxial with said polish rod opening in said first cylindrical member and said polish rod opening in said second cylindrical member.

2. A shock absorber for oil well pumping equipment as described in claim 1 wherein said coil spring member includes a pair of concentric coil springs of opposite pitch positioned within said first and said second cylindrical members.

3. A shock absorber for oil well pumping equipment as described in claim 2 wherein
   said first cylindrical member has an enclosed lower end in which a polish rod opening is substantially centrally thereof and an open upper end;
   said second cylindrical member has an open lower end and an enclosed upper end in which a polish rod opening is substantially centrally thereof; and
   said pair of coil springs normally bear against said lower end of said first cylindrical member and said upper end of said second cylindrical member.

4. A shock absorber for oil well pumping equipment as described in claim 3 wherein said base plate includes a key slot and a key for holding said base plate in position around a polish rod.

5. A shock absorber for oil well pumping equipment as described in claim 4 which includes a single base plate, a single first cylindrical member, a single second cylindrical member and a single pair of coil springs.

6. A shock absorber for oil well pumping equipment as described in claim 5 which includes grasping means on said first cylindrical member to permit easy removal of said cylindrical members from said base plate.

References Cited

UNITED STATES PATENTS

| | | |
|---|---|---|
| 1,137,145 | 4/1915 | Kaarup. |
| 1,307,243 | 6/1919 | Cousins. |
| 3,288,455 | 11/1966 | Robinson _____ 267—1 |

DUANE A. REGER, *Primary Examiner.*